Oct. 26, 1937.  W. G. KEITH  2,097,250
SIGNAL LIGHT
Filed March 7, 1932  4 Sheets-Sheet 1
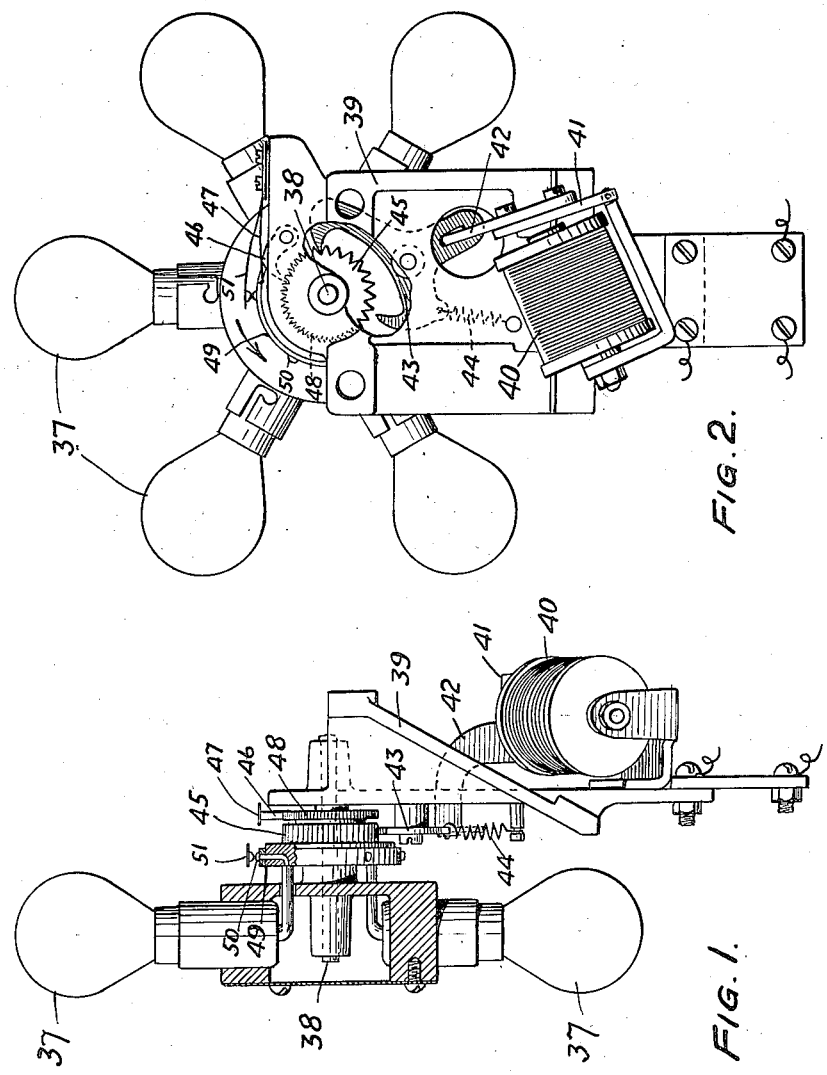
INVENTOR
William G. Keith
BY
Augustus B. Stoughton
ATTORNEY.
WITNESS:
Robt R Kitchel

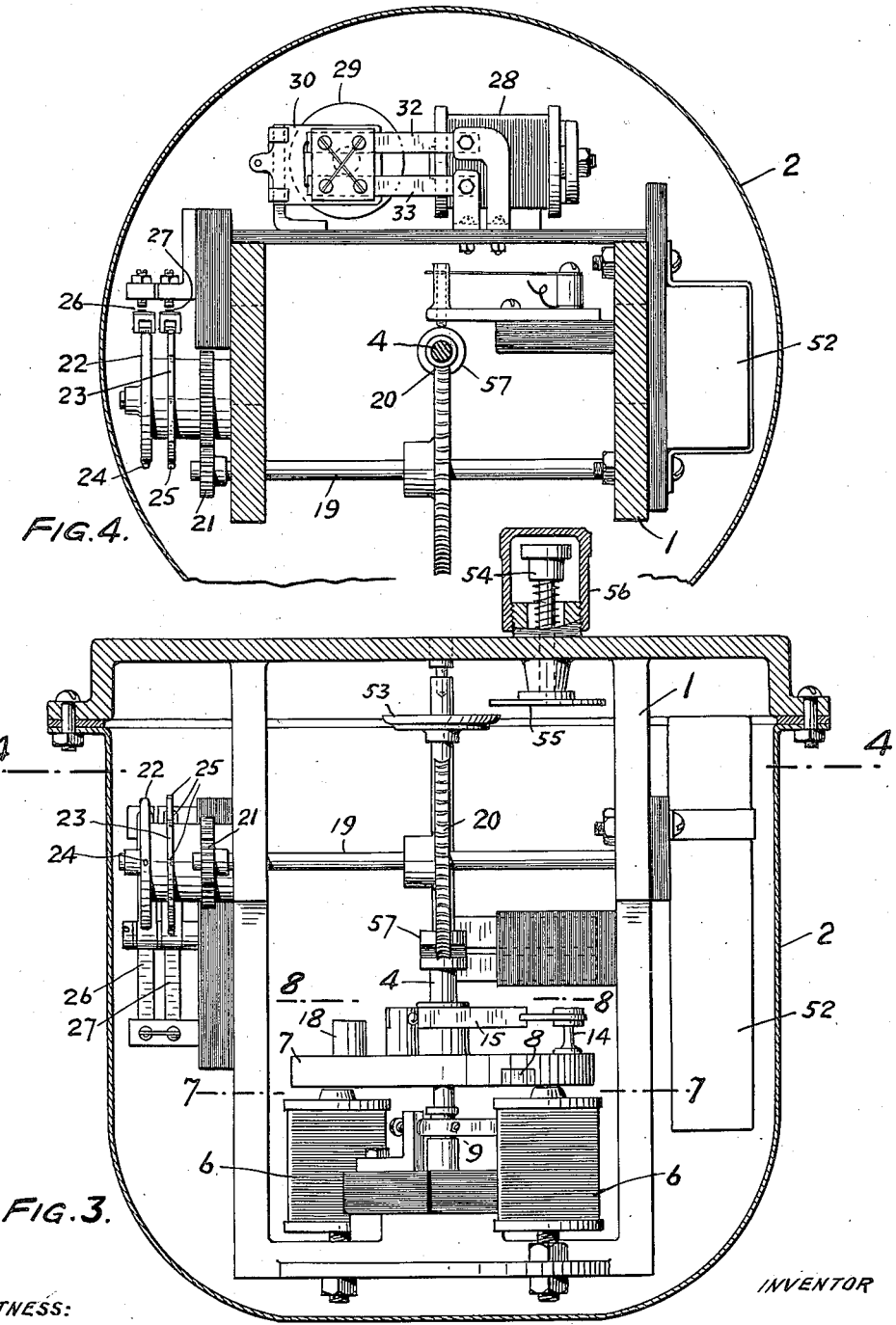

Oct. 26, 1937.  W. G. KEITH  2,097,250
SIGNAL LIGHT
Filed March 7, 1932    4 Sheets-Sheet 3
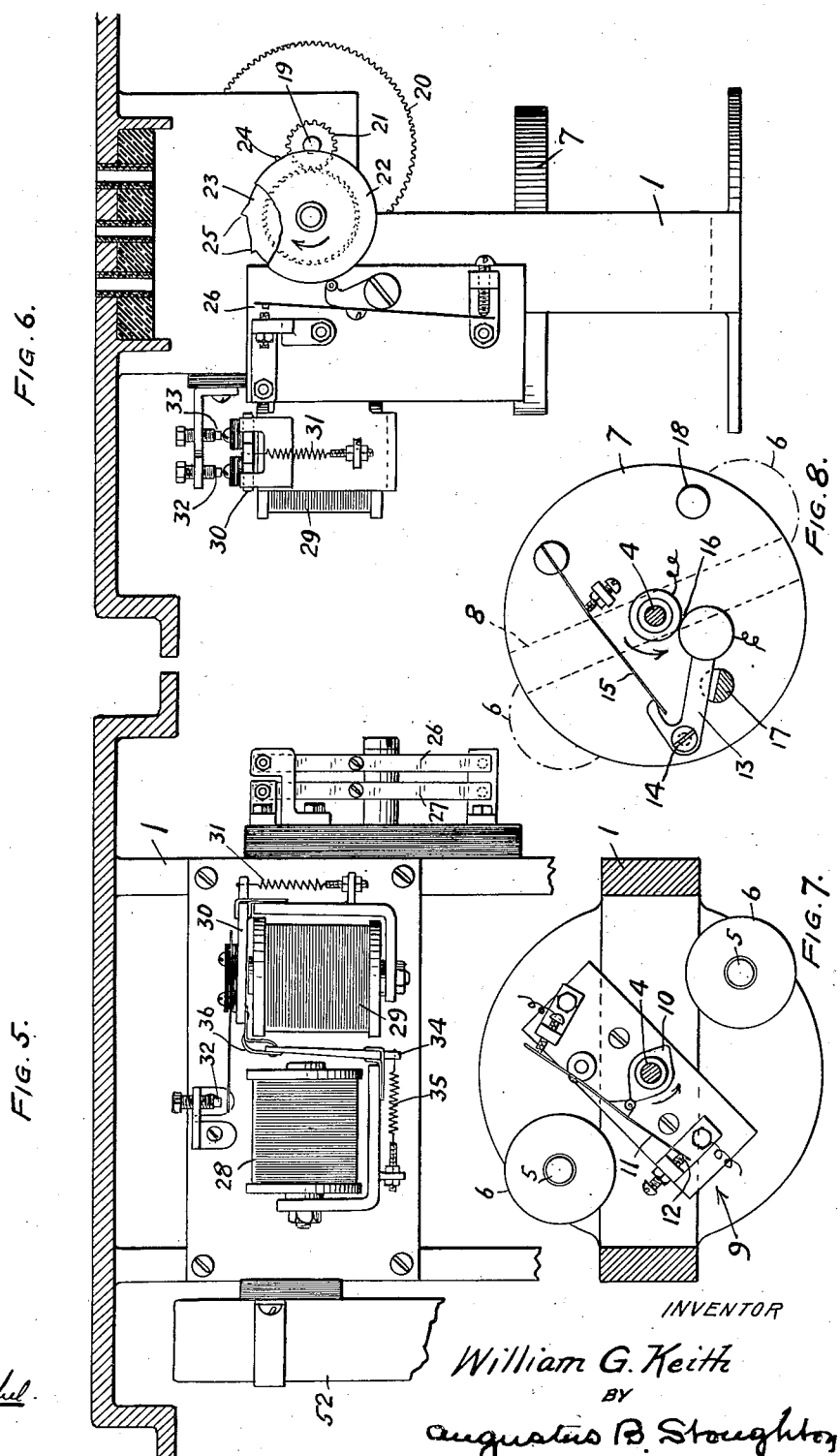

Patented Oct. 26, 1937

2,097,250

UNITED STATES PATENT OFFICE 2,097,250

SIGNAL LIGHT

William G. Keith, Chicago, Ill., assignor to Welsbach Traffic Signal Company, Philadelphia, Pa., a corporation of Delaware Application March 7, 1932, Serial No. 597,104

5 Claims. (Cl. 177—329)

The principal objects of the present invention are to provide signal light mechanism adapted for use in traffic signals and in buoys and which is simple, reliable, efficient, and capable of such adjustments as are or may be appropriate; to economize in the use of current to the end that batteries, even dry batteries, may be satisfactorily employed; to automatically replace a lamp that may fail by another lamp or lamps; to provide for conveniently changing or adjusting the relative periods of light and dark or the duration of the flash of light and the intervals of darkness between the flashes; to insure proper working of contacts or circuit makers and breakers; and, generally, to provide a device of the character mentioned adapted to fill the requirements of use and which shall be compact.

Other objects of the invention will appear from the following description at the end of which the invention will be claimed.

Generally stated, the invention comprises a battery, a motor economical in the use of current and consisting of a disk rotor having a bar armature and a stator including pole pieces and a winding, means actuated by the motor for cutting the winding out of circuit in certain positions of the travel of the bar armature, a group of radially arranged lamps mounted for rotation, an electro-magnetic device for rotating the group of lamps, two circuit makers and breakers driven by the motor and of which one flashes a lamp and of which the other closes a test circuit through a lamp, interlocking electro-magnetic means for substituting in the circuit the means for rotating the group of lamps for a defective lamp, and a condenser on the battery side of any breakers in the circuit.

The invention also comprises the improvements to be presently described and finally claimed.

In the following description reference will be made to the accompanying drawings forming part hereof and in which Figure 1 is a side view, partly in section, of lamp changing mechanism.

Fig. 2 is a front view with parts broken away of the same.

Fig. 3 is an elevational view, partly in section, and with parts omitted.

Fig. 4 is a sectional view taken on the line 4—4 of Fig. 3.

Fig. 5 is an elevational view looking in the opposite direction to that in Fig. 3 and showing an elevational view of parts omitted therefrom.

Fig. 6 is an elevational view of parts shown at the left in Fig. 3.

Fig. 7 is a transverse sectional view taken on the line 7—7 of Fig. 3.

Fig. 8 is a similar view taken on the line 8—8 of Fig. 3, and

Figure 9:
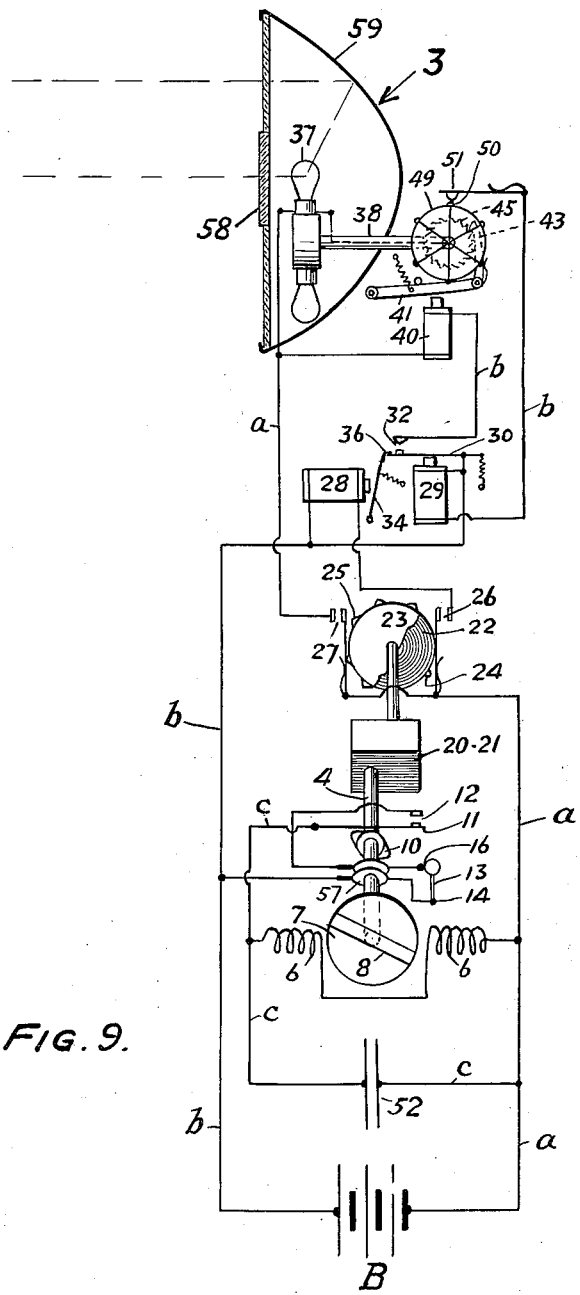
Fig. 9 is a diagrammatic view illustrating the whole device.

There is a frame 1 which carries the various parts and there is a well 2 in which they are enclosed. When this construction is employed the device is removable as a unit and can be mounted in a pedestal or buoy in which is also mounted a battery B and in or on which is also mounted a light 3. Referring more particularly to Figs. 3, 7 and 8, there is a motor shaft 4 mounted for rotation in upper and lower bearings. The motor which drives this shaft comprises a stator consisting of the pole pieces 5 disposed diametrically opposite to each other and of the windings 6 on the pole pieces. The motor consists of a disk 7, as of aluminum, carrying an armature bar 8, as of ferrous metal. 9 is a circuit interrupter shown to comprise a cam 10 mounted on the shaft 4 and operating to cause the spring contact finger 11 to make and break the motor circuit at the point 12. In the position shown the circuit is made or closed at the point 12. As the shaft is rotated by the motor, the cam 10 operates to make or close the motor circuit through the windings 6 only during the short portion of the travel of the ends of the bar or armature 8 in proximity with the pole pieces 5. It will be understood that the disk 7 is started to rotate by means that will be hereinafter described. The purpose of the interruption of the motor circuit is to economize in the use of battery current. There is a governor for the motor and it is shown in Fig. 8. The governor comprises a weighted arm 13, pivoted at 14 to the disk 7. This arm carries the motor current by way of the spring contact 15, and when the weighted end of the arm is in toward the center of the disk, the motor circuit is completed by the contact at 16, but if the motor runs faster than desired, the weighted arm, moving out from the center, breaks the motor circuit at the point 16, and the motor circuit is re-established when the speed decreases and the arm 13 is turned into the position shown in Fig. 8 by the spring of the contact 15. 17 is a stop for the arm 13. It may be remarked that 18 is a counterbalance mounted on the disk 7. 19, Figs. 3 and 4, is a countershaft mounted for rotation in the frame 1 and driven from the motor shaft by the worm and worm gear 20. Through the reducing gear 21 there are driven a pair of disks 22 and 23, Fig. 4, of which the disk 22 is shown as provided with one projection 24 and of which the other is shown as provided with a number of spaced projections or teeth 25. The spaced projections or teeth operate to flash the light, and they may be varied in number and disposition to accomplish that result in the manner described. The projection 24 serves to make or break circuit which will be called a lamp testing circuit. These disks cooperate with spring contact makers 26 and 27. Referring to Fig. 5 the electromagnet 28 is in circuit with the contact maker 26, and the electromagnet 29 is in circuit with the contact maker 27. The electromagnet 29 is provided with a pivotal armature 30 biased by a spring 31 into position for closing a pair of contacts 32 and 33. The electromagnet 28 is provided with a pivotal armature 34 biased by a spring 35 into position for causing the hook 36 to lock the armature 30 into position for breaking contact at the springs 32 and 33, so that if both electromagnets 28 and 29 are energized, the armature 30 is held in position to break contact at the springs 32 and 33, and the armature 34 releases the armature 30, but if only the electromagnet 28 is energized it withdraws the hook 36 and contact at the springs 31 and 32 is made provided that the electromagnet 29 is deenergized. The purpose of this interlocking or holdover electromagnetic mechanism will be further described but, in general, its function is to substitute for a damaged lamp a driving mechanism, hereinafter specified, which will bring another lamp into action. Referring to Figs. 1 and 2, the group of radially disposed lamps 37 are mounted for rotation about an axis 38 carried by a bracket 39 adapted for attachment to some part of a signal pedestal or to a buoy. There is an electromagnet 40 provided with an armature 41 having an arm 42 extending and working through an opening in the bracket. The end of the arm 42 is equipped with a pivotal double pawl 43, acted upon by a spring 44 which tends to draw the armature 41 away from the pole piece of the magnet. This pawl 43 drives a toothed wheel 45 connected with the group of lamps 37 and so rotates the group of lamps in the direction indicated by the arrow. While the double pawl prevents accidental rotation of the lamps in one direction it is sometimes desirable, as in the case of buoys, to prevent accidental rotation of the lamps in the other direction. For this purpose a detent 46, pressed by a spring 47 into the teeth of a toothed wheel 48, may be provided. The insulating wheel 49 with contacts 50 and spring 51 is a means for carrying current to the respective lamps, and it revolves with the group of lamps. 52 is a condenser and its purpose is to take care of inductance in the circuit so that it is placed on the battery side of any breaks in the circuit. It also functions to keep the contacts clean. On the shaft 4 there is a disk or wheel 53, and on the spring retracted hand turned spindle 54 there is another disk or wheel 55. To start the motor, the disk 55 is given a turn which is imparted by the disk or wheel 53 to the shaft 4, and thus the motor is started. 56 is a detachable cap covering the end of the spindle 54. 57 indicates collector rings by which the current is led through the governor contact 16. The lens 58 is shown as mounted in a parabolic reflector 59 and is comparatively opaque at its rim portion.

Referring to Fig. 9, one lead of the battery circuit is indicated at $a$, and the other lead at $b$. Across $a$ and $b$ is a motor circuit $c$. In the motor circuit $c$ are interposed the condenser 52, the contact maker and breaker 12, and the governor 13, mounted on the disk 7, which is heavy enough to run for a while by its own momentum. Across the lead $a$ and lead $c$ are arranged the windings 6. The circuit maker and breaker 23 is interposed between the lead $a$, and the group of lamps, and the circuit maker and breaker 22 is arranged between the lead $a$ and the lead $b$ by way of the electromagnet 28. Interposed in the lead $b$ is the electromagnet 29 and from it $b$ leads to one of the lamps by the element 49, and through a lamp to $a$. From the winding of electromagnet 29 lead $b$ passes contacts 32 and continues through 40 to $a$.

The operation may be described as follows:

The disk or rotor 7 and shaft 4 and parts carried thereby, as well as the countershaft 19 geared thereto, are set in rotation by the starter 54. The motor continues the rotation of the shaft. The cam 10 and contacts 12 conserve current by intermittently interrupting the circuit through the windings 6 as has been described.

Changes in battery voltage due to state of charge, are taken care of by the governor, and the speed of rotation is also kept constant.

The rotation of the circuit maker and breaker 23 does either one of two things. Normally and while a good lamp is in the circuit it flashes the lamp. When a lamp fails, the circuit maker and breaker 23 imparts impulses to the electromagnet 40 in order to turn a defective lamp out of circuit and to turn a good lamp into circuit. The circuit maker and breaker 22 controls a test circuit by which the presence of a defective lamp is detected and replaces it with a new lamp by means of the circuit containing electromagnet 40.

Assuming a good lamp to be in circuit, the electromagnet 40 is cut out at the open contacts 32, and these contacts 32 are held open in two ways, one by the attraction of the electromagnet 29, when energized, and the other by the hook 36. While the electromagnet 29 is energized and is holding the contacts open, the circuit maker and breaker 22 gives an impulse of current to the magnet 28 which withdraws the hook 36, which again reengages before the end of the flash and before the electromagnet 29 is deenergized. If, however, a lamp has gone wrong, it breaks the circuit through the electromagnet 29, and when the hook 36 is released, contact at 32 is made and the electromagnet 40 receives impulses of current from the contact maker and breaker 22 and so turns a new lamp into circuit. When that has been accomplished, the operation proceeds as described.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. In an electric circuit, the combination including, a source of current, a plurality of lamps, a circuit closer biased to closed position, an electro-magnetic device mounted in operative relation to said circuit closer so as to hold said circuit closer open against its bias when said device is energized, a holdover electro-magnetic device biased to normally hold said circuit closer open, a circuit connecting said first-named electro-magnetic device and one of said plurality of lamps in series, a lamp-changer, a circuit connecting said lamp-changer and said circuit closer in series, and means which periodically and simultaneously impress current on and energize both of said electro-magnetic devices, so that said holdover device releases said circuit closer, and said first-named electro-magnetic device is de-energized, if the lamp in series with it is defective and current cannot flow through it, thereby releasing said circuit closer so that said circuit closer closes due to its bias and thereby closes the circuit including said lamp-changer.

2. In a signal lighting device, the combination of, a plurality of electric lights, a source of electricity which serves to supply current to one of said plurality of electric lights and to cut one of said lights out of circuit when it becomes defective and to insert another of said lights in circuit and to operate a flasher switch for flashing the light which is in circuit, a reflector, means for rotatably supporting said lights so that each of said lights can be moved into and out of the axis of said reflector, a light-changer for rotating said lights, a circuit closer biased towards closed position, a first circuit connecting said light-changer and said circuit closer in series, an electro-magnetic device in operative relation to said circuit closer and which holds said circuit closer open when said device is energized, a second circuit connecting said device and one of said lights in series, a holdover electro-magnetic device biased to hold said circuit closer open when de-energized and to disengage said circuit closer when energized, a periodically operated switch, a third circuit connecting said holdover device and said periodically operated switch in series across said circuit, a flasher switch, a fourth circuit connecting said flasher switch in series with said first and second circuits across said source, a cam for periodically opening and closing said flasher switch, a second cam for periodically opening and closing said periodically operated switch simultaneously with some of the operations of said flasher switch so that both said first-named electro-magnetic device and said holdover device are energized at once so that the circuit closer is closed and said light-changer operated if said first-named electro-magnetic device is de-energized by the failure of the light in series with it, and a motor mechanically connected to said cams so as to operate them.

3. In a signal lighting device having a source of current and a plurality of lamps mounted so that a selected one of said lamps is connected across said source of current and a flasher controlling the connection of said selected lamp to said source, the combination comprising, an electrically operated lamp changer, a circuit across said source including said lamp changer, a switch in said circuit biased to closed position, a latch co-operating with said switch to normally hold said switch in open position, means for periodically freeing said switch from the control of said latch simultaneously with at least some of the operations of said flasher, and a coil connected in series with said selected lamp across said source, said coil, when energized by current passing through said flasher and said lamp which is connected to said source and said coil, restraining said switch against closing and said coil, when de-energized by failure of said lamp which is connected to said source to pass current during a time at which said switch is freed by said means from the control of said latch, allowing said switch to close.

4. A signal light mechanism comprising, a source of current, a flasher having contacts which are periodically engaged and disengaged, a plurality of lamps, a first switch having contacts for connecting one of said lamps and for disconnecting another of said lamps, a motor arranged to operate said switch, first electromagnetic means arranged when energized to prevent operation of said motor and when de-energized to free said motor for operation, a circuit connecting said source and said flasher and one of said lamps and said first switch and said first electromagnetic means in series so that said flasher lights and darkens said lamp, second electromagnetic means arranged when de-energized to prevent operation of said motor and when energized to free said motor for operation, a second switch having contacts which are periodically engaged simultaneously with at least some of the engagements of the contacts of said flasher, and a circuit connecting said second electromagnetic means and said second switch in series across said source so that when the contacts of said flasher and of said second switch are engaged said second electromagnetic means is energized and said first electromagnetic means is de-energized, if the lamp which is in circuit is defective, thus causing operation of said motor.

5. A signal light mechanism, comprising, a battery, a flasher, a plurality of lamps, a rotatable support for said lamps, a first switch having contacts co-operating with said lamps to connect one of said lamps and to disconnect another of said lamps, an electric motor arranged to rotate said support and to operate said first switch, a second switch controlling the operation of said electric motor, first electromagnetic means arranged when energized to cause said second switch to prevent said electric motor from operating and when de-energized to free said second switch from control of said first electromagnetic means, second electromagnetic means arranged when energized to free said second switch from control of said second electromagnetic means and when de-energized to cause said second switch to prevent said electric motor from operating, a third switch, a circuit connecting said battery and said flasher and one of said lamps and said first switch and said first electromagnetic means in series, a second circuit connecting said battery and said second electromagnetic means and said third switch in series, a third circuit connecting said battery and said flasher and said electric motor and said second switch in series, and a motor periodically closing said flasher and, simultaneously with at least some of the closings of said flasher, closing said third switch so that when said flasher and said third switch are closed said second electromagnetic means is energized and frees said second switch from its control and said first electromagnetic means is de-energized, if the lamp in series with it is defective, and also frees said second switch from its control so that said second switch causes said electric motor to operate said support and said first switch and to thereby insert a new lamp in circuit.

WILLIAM G. KEITH.